Dec. 10, 1963 J. C. FAKAN 3,113,454
SENSING PROBE ACTUATOR
Filed Sept. 26, 1960
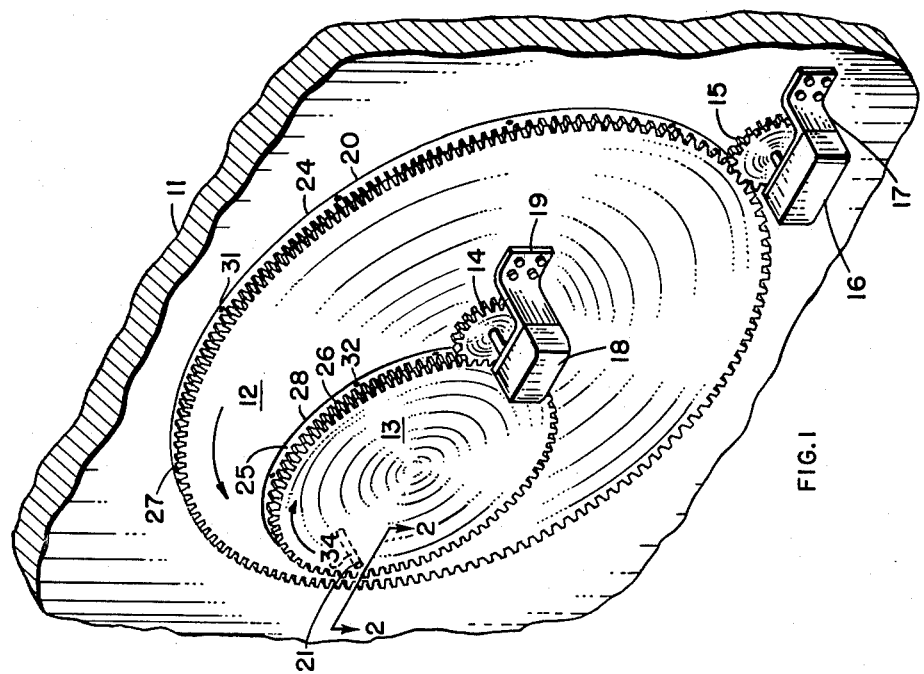
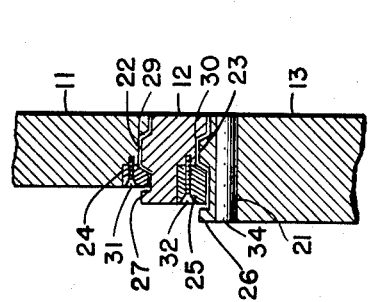
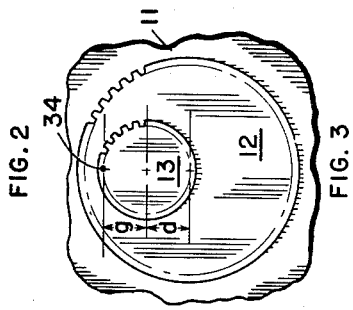
INVENTOR
JOHN C. FAKAN
BY
ATTORNEY 3,113,454
SENSING PROBE ACTUATOR
John C. Fakan, 6045 Robert Drive, Cleveland 30, Ohio
Filed Sept. 26, 1960, Ser. No. 58,586
12 Claims. (Cl. 73—147)
(Granted under Title 35, U.S. Code (1952), sec. 266)

The invention described herein may be manufactured and used by or for the Government of the United States of America for governmental purposes without the payment of any royalties thereon or therefor.

The present invention relates to an actuator for a sensing probe which measures the fluid pressure fluctuations in a wind tunnel.

In wind tunnels having an air flow velocity of Mach .5 or above, difficulty has been encountered in using sensing probes, particularly those which protrude through the wind tunnel wall to measure the fluid pressure fluctuations of the air flow along the section of the tunnel wall adjacent the testing area, because of their perturbance of the air flow. To prevent such perturbance of the air flow it has been suggested that the sensing probes be installed flush with the inside surface of the tunnel wall. The sensing of probes have been so installed by providing a large number of fixed ports in the wall of the wind tunnel through which the sensing probes could be mounted to sufficiently cover the test area or other areas which are of interest. This arrangement, however, has certain disadvantages because the minimum distance between two adjacent positions of each sensing probe would be at least equal to the outer diameter of the port, which would usually be too large to provide the desired data, and the changing of the probe position would require that the tunnel be shut down and restarted at each change. The present invention overcomes these disadvantages by providing an actuator means for mounting a sensing probe flush with the inside surface or face of the enclosing wall of the tunnel, which actuator means is adapted to move the sensing probe to a multiplicity of different positions over the entire area to be tested without requiring the shutting down of the tunnel.

One of the objects of this invention, therefore, is to provide a sensing probe mount in a wind tunnel which is flush with the inside surface of the tunnel so as not to perturb the air flow.

Another object is to provide a sensing probe actuator mount which will move the sensing probe over the entire area to be tested.

Other objects and many attendant advantages of the present invention will be apparent from the following detailed description when taken together with the accompanying drawings in which:

FIG. 1 is a perspective view which illustrates the actuator mount for the sensing probe installed in a wind tunnel.

FIG. 2 is a sectional view taken on line 2—2 of FIG. 1.

FIG. 3 is an elevational view diagrammatically showing the relationship of the actuator discs.

The sensing probe actuator is illustrated in FIG. 1, and is composed of two circular discs 12 and 13 which are mounted within a section of a wind tunnel wall 11 so as to be flush on the side subject to high velocity air flow. The wind tunnel wall 11 is provided with a large circular opening 20, which may be six feet in diameter, having a groove 29 along its circumference. Inside of the large circular opening 20 is mounted the large circular disc 12 which is provided with a rib 22 on its outside circumference that slidably fits into the groove 29 and thereby holds the large disc in position for rotative movement. A collar 24 forms a part of the groove 29 and is secured to the wind tunnel wall 11 by machine screws 31. By removing the collar 24 the large disc 12 may be slipped into and out of the large circular opening 20. A small circular opening 28 is similarly provided in the large disc 12 with a groove 30 in its circumference in which is mounted the small disc 13 which has a rib 23 on its outside circumference that slidably fits into the groove 30. The small disc 13 may be installed or removed from the small circular opening by turning the screws 32 to remove a collar 25 which forms a portion of the groove 30.

A bracket 17 is secured to the outside surface of the tunnel wall by suitable means and it supports a small motor 16 which provides power for drive gear 15. The motor 16 may be either electric or hydraulic. A similar bracket 19 is secured to the outside surface of the large disc 12 and it also supports a motor 18 which provides power for the drive gear 14. The large disc 12 has an offset portion provided with gear teeth 27 which are positioned outwardly from the outside surface of the tunnel wall and which mesh with the drive gear 15. The small disc 13 also has an offset portion provided with gear teeth 26 which are positioned outwardly from the outside surface of the large disc 12 and which mesh with the drive gear 14.

The sensing probe 34 is shown in whole in FIG. 2 and may consist of any type of sensing means that can be seated in the opening or mount means 21 in the smaller disc 13. For example, a small condenser microphone mounted in the opening or mount means 21 flush with the inside surface of the tunnel wall has been found to be an excellent sensing probe to detect the pressure fluctuations in the boundary layer of the air flow. The mount means 21 is placed as far as possible from the center of the small disc 13 and is limited only by the mechanical requirements for supporting the sensing probe 34.

The position of the small disc 13 on the large disc 12 is best illustrated by FIG. 3 and is such that distance $g$ between the central axis of the small disc 13 and the center of the sensing probe is equal to the distance $d$ between the central axis of the large disc and the central axis of the small disc. This relationship between the two discs is necessary if every point within the area to be scanned is to be reached by the sensing probe. The radius of the outer limit of the area to be covered is, therefore, the sum of the distances $d$ plus $g$.

The operation of the sensing probe actuator mount provides a complete coverage of the area to be tested in a relatively simple manner without changing the smoothness of the inside surface of the tunnel wall. The motor 16 is activated by suitable means to rotate drive gear 15 which, because it is in mesh with gear teeth 27 of the large disc 12, will rotate the large disc 12 and the small disc 13 about the center of the large disc 12 until the sensing probe 34 reaches some predetermined point and the motor 16 is stopped. If it is necessary to move the sensing probe toward the center of the area to be scanned, the motor 18 is activated by suitable means to rotate drive gear 14 and in turn the small disc 13 until the sensing probe reaches some predetermined point toward the center of the area to be scanned. The motors 16 and 18 may be operated either independently or simultaneously.

It is obvious that manually operated cranks could be substituted for the motors 16 and 18 or a suitable electronic control unit could be used to program a series of locations for the sensing probe through the motors 16 and 18 automatically.

It should be established that the actuator is not in any way limited to applications involving wind tunnels having a wind velocity of Mach .5 or above. Actually, the actuator may be used at any wind velocity whatsoever and the particular discussion relating to the use of the actuator in wind tunnels having a wind velocity of Mach .5 or above is by way of specific example only. Moreover the actuator has been successfully used at wind velocities as low as Mach .2.

Obviously, many modifications and variations of the present invention are possible in the light of the above teachings. It is, therefore, to be understood that within the scope of the appended claims the invention may be practiced other than as specifically described.

I claim:

1. In combination with a wind tunnel having a wall confining an air flow of high velocity, an actuator comprising a circular disc rotatively mounted within said wall and presenting a face flush with the inside surface of said wall so as not to perturb the air flow, and a sensing probe means within and offset from the center of said circular disc.

2. In combination with a wind tunnel wall, an actuator comprising a large disc rotatively mounted within said wall and presenting a face flush with the inside surface of said wall, a small disc rotatively mounted within said large disc and presenting a face which is flush with the flush faces of said large disc and said wall, and a sensing probe means mounted on said small disc.

3. The combination as defined by claim 2 wherein the central axis of said small disc is offset from the central axis of said large disc.

4. The combination as defined by claim 2 including a pair of motor means, one motor means secured to said wall and adapted to rotate said large disc about its central axis and the other motor means secured to the large disc and adapted to rotate the small disc about its central axis.

5. The combination as defined by claim 4 wherein the one motor means is secured by a bracket to the outside surface of said wall and the other motor means is secured by a bracket to the outside surface of said large disc.

6. A sensing probe actuator comprising a supporting wall having an opening and a groove forward therein, a disc rotatively mounted within said opening carrying a sensing probe means, said disc having a rib slidably fitted within said groove, one side of said disc having an offset portion spaced outwardly from the corresponding side of said supporting wall and being provided with a set of gear teeth which extend along the periphery thereof, and a motor means mounted on said supporting wall and having a drive gear in mesh with the gear teeth.

7. A scanning probe actuator as defined by claim 6 wherein the side of said disc opposite said offset side is flush with the corresponding side of said supporting wall.

8. An actuator comprising a supporting wall having a large circular opening extending through its faces and a groove extending along the circumference of the large opening, a large circular disc rotatively mounted within said large opening and having one face thereof flush with the corresponding face of said supporting wall, said large disc having a rib along its circumference which is slidably received within the groove of said large opening, said large disc having a small circular opening offset from its center which extends through its faces and a groove extending along its circumference, a small circular disc rotatively mounted in said small circular opening and having one face thereof flush with the corresponding flush faces of said large disc and said supporting wall, said small disc having a rib along its circumference which is slidably received within said groove of the small opening, a mount means for a sensing probe within said small disc which is offset from the center of said small disc, a means for rotating said large disc about its own center, and a means for rotating said small disc about its own center.

9. An actuator as defined by claim 8 wherein the other face of said large disc is offset outwardly from the corresponding face of said supporting wall and has a portion provided with gear teeth, and said means for rotating said large disc about its own center includes a drive gear in mesh with the gear teeth of said large disc.

10. An actuator as defined by claim 9 wherein the outer face of said small disc is offset outwardly from the corresponding faces of said large disc and said supporting wall, and has a portion provided with gear teeth, and said means for rotating said small disc about its own center includes a drive gear in mesh with the gear teeth of said small disc.

11. An actuator as defined by claim 8 wherein said mount means for a sensing probe is offset from the center of the small disc a distance equal to the distance between the center of said small disc and the center of said large disc.

12. An actuator as defined by claim 8 wherein said sensing probe is of the pressure sensing type.

References Cited in the file of this patent

UNITED STATES PATENTS

| | | |
|---|---|---|
| 1,975,711 | Borden | Oct. 2, 1934 |
| 2,202,900 | Draper | June 4, 1940 |
| 2,335,645 | Celio | Nov. 30, 1943 |
| 2,377,605 | Binkley | June 5, 1945 |
| 2,515,251 | Morris | July 18, 1950 |
| 2,855,801 | Brauer et al. | Oct. 14, 1958 |
| 2,935,870 | Lyons | May 10, 1960 |
| 2,957,345 | Cheney | Oct. 25, 1960 |
| 2,968,944 | Manoni | Jan. 24, 1961 |
| 2,976,466 | Grinstead | Mar. 21, 1961 |

OTHER REFERENCES

I.S.A. Journal, August 1960, article by Harris et al., "Pressure and Force Transducers For Shock Tunnels," pages 62–66.